3,352,735
METHOD OF PREPARING LAYERED NON-WOVEN PRODUCTS FROM CONTINUOUS FILAMENTARY TOW MATERIALS
Robert C. Harrington, Jr., and James L. Smith, Kingsport, Tenn., assignors to Eastman Kodak Company, Rochester, N.Y., a corporation of New Jersey
Continuation of application Ser. No. 307,442, Sept. 9, 1963. This application Oct. 25, 1966, Ser. No. 589,462
4 Claims. (Cl. 156—180)

ABSTRACT OF THE DISCLOSURE

A method of preparing layered non-woven products from continuous filamentary tow materials which includes the steps of banding the filaments, overlapping the tow upon itself at approximately a 45° angle and plasticizing the thus folded tow.

---

This application is a continuation of application Ser. No. 307,442 filed on Sept. 9, 1963 and now abandoned.

This invention relates to preparation of a non-woven product suitable for use in fabrics, adhesive pads, tampons, disposable diapers and the like. More particularly it concerns the manufacture of a non-woven article from continuous crimped filaments.

Known to the non-woven art is the method of building up a web by laying several layers of slivers or staple fibers upon each other by use of an endless lattice caused to rotate slowly away from the feed or supply machine. See, for example, U.S. Patent 3,022,813. The web may then be impregnated with a suitable bonding agent. Also known is a method whereby elastomeric threads or filaments may be deposited in a random overlapping arrangement on a moving belt to which they will adhere only slightly and then may be stripped from the belt in web form after curing as in U.S. Patent 3,010,865. The non-woven articles formed by these methods although generally satisfactory for many purposes sometimes fail to meet the requirements of end uses which demand durability, viz., considerable strength or ability to hold together, particularly in the transverse or lateral direction. Therefore it is apparent that development of a durable non-woven product of improved lateral strength represents a highly desirable result. After extended investigation we have found a method and apparatus arrangement for manufacturing a novel non-woven product of enhanced lateral cohesiveness.

One object of this invention is to provide a novel non-woven product. Another object is to provide process and apparatus for making a non-woven article of increased transverse strength. A further object is to provide a simplified method of converting continuous filaments into a non-woven product without the use of a forming belt. Further objects will be apparent hereinafter.

In its broader aspects, our invention involves the preparation of a non-woven product made up of a single layer of substantially parallel continuous filaments overlapped at an angle of from 15 to 90°, preferably about 45°. According to our invention the overlapping is accomplished by use of a rotating platform or turntable upon which is mounted pretreatment apparatus from tow bale to delivery rolls. The platform or turntable is stationary except for turning on its axis, that is, rotating continuously through a 360° angle. The speed of rotation may be adjusted relative to the rate of movement of crimped tow as it is removed from the bale through the various treating operations prior to having plasticizer applied thereto and then being treated by calender or embossing rolls before emerging as a finished self-contained and adhering non-woven fabric. This adjustment of the revolution speed of the rotating platform relative to the rate of movement of the tow may be varied to obtain the desired overlapping angle. We have found that by use of such an overlapping operation the lateral strength of the finished fabric is surprisingly improved, particularly at when the angle of overlapping is about 45°. Revolving with the rotating platform and turntable in respective order for preliminary treatment of the tow, which may be removed from a bale or other appropriate container positioned more or less centrally on the platform, are countercurrently rotating feed rolls, a tow opening device or means for spreading or fluffing the tow, further opening means, for example, opening rolls, and delivery rolls. The tow is twisted or overlapped on itself as it leaves the delivery rolls which form the last treating device anchored to the rotating platform. The band of tow in its twisted or overlapped form is next conducted between adjustable holding rolls before treatment by the calender or embossing rolls. An appropriate plasticizer or bonding agent such as triacetin may be applied prior to the calendering or embossing step. The non-woven product as it leaves the calendering or embossing rolls is self-adhering.

For a further understanding of our invention reference is now made to the drawing which forms a part of this specification.

Figure 1:
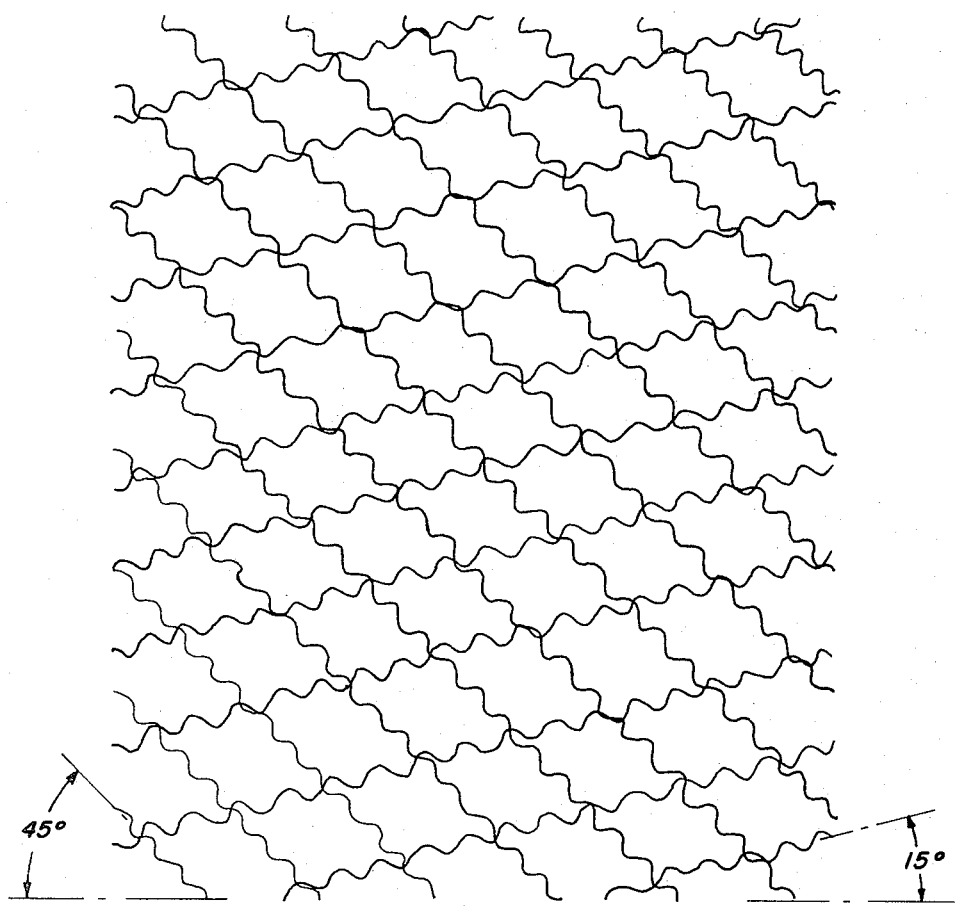
FIG. 1 is a diagram of the non-woven product of this invention.

In FIG. 1 the upper filaments are shown overlapping the lower filaments at approximately a 45° angle.

Figure 2:
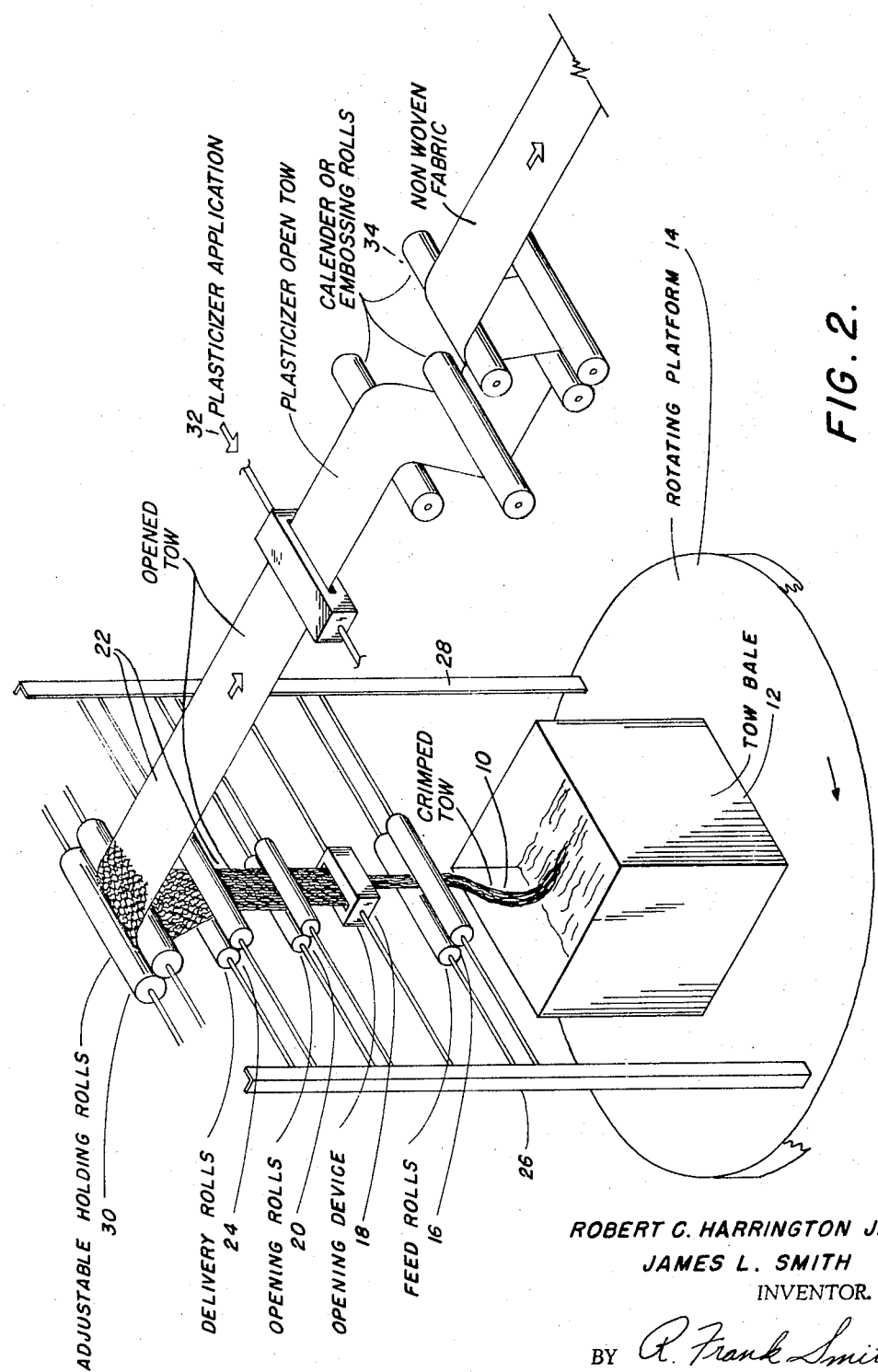
FIG. 2 is a perspective view in semi-schematic form showing treatment of the tow and formation of the non-woven fabric according to our invention.

Referring now to FIG. 2, crimped tow 10 is continuously withdrawn from tow bale 12 positioned substantially centrally on platform 14 as it rotates continuously around its axis. The crimped tow 10 is first fed through feed rolls 16 and then conducted through an opening device 18. This opening device may consist of a jet such as that disclosed in U.S. Patent 3,079,663 to our coworkers Dyer and Gallagher. If further opening is desired, the tow may then be moved through tow opening rolls 20 to bring about the desired degree of bulkiness and spreading. The opened tow 22 is next conducted between delivery rolls 24, which are the last treating device attached by perpendicularly positioned anchor bars 26 and 28 to the rotating platform 14 so as to turn therewith as it turns around its axis in 360° revolutions. The spread-out and opened tow is next conducted between adjustable holding rolls 30, after which it may have plasticizer applied thereto by means of plasticizer applicator 32 such as that used in our coworker John Winston Smith's patent, U.S. 3,016,581. After the application of plasticizer to the tow, it is conducted over calender or embossing rolls 34. The product emerging from these rolls 34 is a finished non-woven fabric of improved strength, particularly in the lateral direction characterized as above described by the single layer overlapping of filaments at an angle of from 15 to 90°, preferably about 45° to obtain maximum strength.

The following examples are illustrative of our invention:

EXAMPLE I

Cellulose acetate tow of 5 denier per filament and 55,000 total denier and 9 crimps per inch was opened by tensioning and relaxing the tow band in a longitudinal direction by beating it with a vibrating bar extending transverse to the longitudinal direction in which the tow was passing under tension between two sets of power-driven rolls. The tow was folded upon itself as it was being opened by attachment of the opening device to a rotating platform on which was placed the bale from which the tow was continuously removed. The opened band of tow was then passed through a banding jet attached to the platform and rotating therewith. In the jet compressed air spread it evenly to a width of 9″. The tow was then sprayed with glyceryl triacetate (10% based on the tow weight) and passed between embossing rolls heated to 100° C. and thence to a take-up roll from which emerged a finished non-woven fabric.

EXAMPLE II

The same tow as in Example I was taken from a bale, passed over an 8″ banding jet and then between two rotating rolls operating one against the other. It was next passed over a wick type applicator, whereby glyceryl triacetate was applied at a concentration of 10% based upon the tow weight. The tow was then passed through a jet such as that depicted in U.S. Patent 3,079,663 and then over embossing rolls. The non-woven fabric so produced had strength in both directions and was useful for decorative purposes, filter cloth, and other useful applications.

EXAMPLE III

An acetate tow of 2.1 denier per filament, 60,000 total denier, crimped to 15 crimps per inch was opened with a fluffing jet as in Example II. Prior to passing it through the embossing rolls, a length was twisted such that the filaments were overlapped, the upper filaments forming a 45° angle with respect to the lower filaments. It was embossed at 100° C. The non-woven fabric had increased strength in the lateral direction and adequate strength in the longitudinal direction, making it useful in many applications.

EXAMPLE IV

Two separate samples of continuous multifilament acetate tow were twisted upon themselves by use of a rotating platform in accordance with the present invention and their cross strength or lateral strength compared to the same tow in untwisted form. The untwisted tow was prepared using the same apparatus with the exception that the platform was used in a stationary position rather than being rotated upon its axis. The measurements of the cross or lateral strength were made by an Instron tester, which measures the amount of strength required for breakage. The results of this comparison are shown in the following table recording the increase in cross strength by overlapping at 30° and 45° angles. The percentage results are based upon a 36 lb. breakage strength for a straight web of tow with no overlapping.

| Angle: | Cross-strength increase, percent [1] |
|---|---|
| 0° | --- |
| 30° | 25 |
| 45° | 200 |

[1] Based on 1.5 oz./yd.² 2-ply web.

It is thought apparent from the foregoing description and examples that we have provided a novel non-woven product made up of a band of continuous multifilament tow wherein the filaments are overlapped upon themselves in a single layer at an angle from 15 to 90° by use of a rotating platform positioned prior to introduction of the tow to calendering or embossing rolls. The increase of the overlapping angle to an optimum of 45° results in a corresponding increase in lateral strength or adherence of the non-woven product.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A method for the production of non-woven fabric comprising the steps of delivering from a source of supply a tow of substantially parallel continuous filaments, holding a portion of said tow substantially in the plane of its direction of feed, simultaneously folding the tow upon itself, transporting the folded tow to a subsequent treatment zone, and in that zone applying a plasticizer to said tow so that the lateral tensional strength of the folded tow is materially enhanced.

2. The method as set forth in claim 1 wherein the tow is folded upon itself by rotating the delivering means in a plane substantially perpendicular to the plane of feed of the tow.

3. The method as set forth in claim 1 which includes spreading the tow prior to folding it upon itself.

4. The method for the production of non-woven fabric comprising the steps of feeding from a source of supply a tow of substantially parallel continuous filaments, spreading the tow laterally of the feed direction, holding a portion of the spread tow substantially in the plane of feed, simultaneously rotating the feed means to thus lap the tow upon itself, further feeding the overlapped tow to a treatment zone, treating the tow by the application thereto of a plasticizer in said treatment zone, and subsequently compressing the treated tow so that the lateral tensional strength of the lapped tow is materially enhanced.

References Cited

UNITED STATES PATENTS

| 3,016,581 | 1/1962 | Smith | 156—181 |
| 3,017,309 | 1/1962 | Crawford et al. | 156—180 |
| 3,079,663 | 3/1963 | Dyer et al. | 161—173 |
| 3,080,611 | 3/1963 | Jarrett et al. | 156—167 |

MORRIS SUSSMAN, *Primary Examiner.*